United States Patent
Myers (10) Patent No.: US 8,375,933 B2
(45) Date of Patent: Feb. 19, 2013

(54) SYSTEM AND METHOD FOR HEAT ENERGY CONSERVATION VIA CORNER REFLECTORS

(76) Inventor: Blaine E. Myers, Swissvale, PA (US)

(*) Notice: Subject to any disclaimer, the term of this patent is extended or adjusted under 35 U.S.C. 154(b) by 272 days.

(21) Appl. No.: 12/358,839

(22) Filed: Jan. 23, 2009

(65) Prior Publication Data

US 2009/0185265 A1 Jul. 23, 2009

Related U.S. Application Data

(60) Provisional application No. 61/022,965, filed on Jan. 23, 2008.

(51) Int. Cl.
*A61F 7/00* (2006.01)
*A61F 7/08* (2006.01)
*G02B 5/122* (2006.01)

(52) U.S. Cl. .................... 126/204; 359/529

(58) Field of Classification Search .......... 359/529–530, 359/838, 850, 839; 126/204–205, 684; 607/88–91, 607/96; 219/258; 313/113–114; 362/382
See application file for complete search history.

(56) References Cited

U.S. PATENT DOCUMENTS

| 2,452,822 | A | * | 11/1948 | Wolf | 342/7 |
| 3,924,929 | A | * | 12/1975 | Holmen et al. | 359/514 |
| 4,149,521 | A | | 4/1979 | Miller et al. | |
| 4,816,714 | A | * | 3/1989 | Walsh | 313/111 |
| 5,189,554 | A | | 2/1993 | Vanasse et al. | |
| 5,298,752 | A | | 3/1994 | Wight | |
| 5,814,355 | A | | 9/1998 | Shusta et al. | |
| 6,007,245 | A | * | 12/1999 | Looy | 383/116 |
| 6,596,997 | B2 | | 7/2003 | Kaufman | |
| 7,073,926 | B1 | * | 7/2006 | Kremers et al. | 362/419 |
| 7,135,035 | B1 | * | 11/2006 | Dimmick | 607/90 |
| 7,195,202 | B2 | | 3/2007 | Leupolz et al. | |
| 2008/0212181 | A1 | | 9/2008 | Wu | |

FOREIGN PATENT DOCUMENTS

EP    0 408 235    1/2010

* cited by examiner

*Primary Examiner* — Alessandro Amari
*Assistant Examiner* — Kimberly N Kakalec
(74) *Attorney, Agent, or Firm* — The Webb Law Firm (57) ABSTRACT

A method for conserving heat emanated from an individual includes situating a corner reflector array near the individual, whereby the heat is retro-reflected back to the individual. The corner reflector array may include a plurality of corner cube reflectors. An apparatus for retro-reflecting heat back to the individual includes a plurality of corner cube reflectors arranged in an array and adapted to be mounted to a wall, ceiling, or other surface.

2 Claims, 6 Drawing Sheets

SYSTEM AND METHOD FOR HEAT ENERGY CONSERVATION VIA CORNER REFLECTORS

CROSS REFERENCE TO RELATED APPLICATIONS

This application claims the benefit of U.S. Provisional Patent Application No. 61/022,965 filed Jan. 23, 2008, and entitled "System and Method for Heat Energy Conservation Via Corner Reflectors," the contents of which are incorporated herein by reference.

BACKGROUND OF THE INVENTION

1. Field of the Invention

The present invention relates to the use of corner reflectors for heat conservation and, more particularly, to the use thereof in a living environment and other applications.

2. Description of Related Art

Generally, individuals prefer to be and feel warm in cool weather. Ideally, the indoor temperature would be increased to maintain a warm ambient temperature condition. However, there are usually significant energy costs associated with maintaining this desirable condition. To address these energy concerns, homes and businesses have lowered thermostat settings to save money and lower carbon dioxide emissions. Of course, this action results in a failure to maintain the warm ambient temperature condition. To counter the lowered thermostat setting, individuals may opt for the installation of small space heaters, usually powered by electricity or a hydrocarbon based fuel. In some countries, a small charcoal burner may be used. However, this results in only localized heating with still some type of electrical or fuel cost associated therewith. Of course, there are inherent fire risks involved with the operation of some such space heaters. The only alternative has been for individuals to make clothing choices that are conducive to trapping and maintaining body heat, such as, by layering or wearing a sweater and thermal underwear. However, this adds to bulkiness, which an individual may view as uncomfortable.

People radiate enough heat that they would shortly go hypothermic if they weren't getting most of it back from the environment including clothing. Some of that radiated heat hits the person again directly (e.g., one finger to the next) and is immediately reabsorbed. Most heat hits their clothing, which is so close that it is not that much cooler, so reradiates back almost as much as was lost. However, the temperature of the inside of the clothing depends on the net amount of heat radiated by the outside of the clothing. As even the outside of clothing is warmer than the walls, ceiling, floor and furniture, there is still a net loss of heat by radiation from the clothing.

As is known in the art, people can be more comfortable in a room with warm walls and cool air than they are in a room with cool walls and warm air. The reason for this is that objects radiate energy or infrared heat at a rate proportional to the temperature to the fourth power. Therefore, a warm object gives off substantially more heat by radiation than a cool object. For example, it has not been generally realized that an average-sized adult human body gives off about eight hundred watts of heat power by radiation, though part is emitted in such a direction that it strikes another area of the body. Most of the heat power given off by the body is returned to the body via radiation back from the environment, including a person's own clothing, however, the environment is usually cooler so that it returns less radiant heat energy than is given off by the body. Basically, the cooler the surroundings, the less heat a person receives back via thermal radiation. Thus, by radiant heat transfer, a person can lose more heat to cool surroundings than they get back from the surroundings that they feel uncomfortable, even at air temperatures that one would think should feel comfortable.

There are two main kinds of retro-reflectors in common use today, namely, the cat's eye and corner cube reflector. The cat's eye reflector uses transparent spheres with a reflective base to project focused incoming light back in the direction it came. Such reflectors would not be good for heat reflection unless the transparent sphere was good at transmitting at infrared wavelengths. A typical cube corner kind of retro-reflector is used in automobile tail light reflectors and allows light to penetrate the material and then uses total internal reflection to change the light direction three times in one cube to send it back in the incoming direction. However, this variety of corner reflector is neither intended nor adapted for heat reflection.

It is, therefore, desirable to overcome the above problems and others by providing a system and method for conserving heat dissipated by a person situated within a cool environment.

SUMMARY OF THE INVENTION

Accordingly, I have invented a system and method for heat conservation utilizing corner reflectors. It is known in the art that reflection can be used to keep people warm when the reflectors are quite close to a person, as is the case with highly reflective metallized thin plastic sheets used as emergency blankets. It has also been proposed in the art that retro-reflector arrays may be used to return heat to quite hot objects. However, the present invention contemplates the use of retro-reflector arrays in normal living environmental temperatures at a distance from persons and objects.

Specifically, the present invention includes the use of infrared retro-reflective surfaces, namely one or more corner reflector arrays, situated near the individual that desires to feel warmer than the ambient environment temperature would otherwise permit. The corner reflector array offers high reflectivity in the infrared energy band, thereby, causing the individual's heat energy to bounce back to the individual, and making them feel warmer than they would if they were only subject to the ambient environment temperature. The present invention allows the individual to stay warm while not expending any energy costs or $CO_2$ emissions that are normally associated with prior art systems and methods of keeping the individual warm in cool environments, and without requiring the many layers of clothing that have been the previous method of choice.

A method for conserving heat emanated from an individual includes the step of situating a corner reflector array near the individual, wherein the heat is retro-reflected back to the individual from the corner reflector array. The corner reflector array may include a plurality of corner cube reflectors. The edge of a face of each corner cube reflector may abut or may be joined to an edge of a face of an adjacent corner cube reflector. The angle at which each of the edges abuts or is joined to respective edges is substantially 90°. The size of each of the corner cube reflectors is between ¼" to 2" cubed. The corner cube reflectors may each include a metallic surface. The method may further include the step of controlling the amount of heat retro-reflected back to the individual by deforming one or more of the corner cube reflectors by stretching or bending thereof and/or by tilting the corner reflector array in relation to the individual. The corner reflector array may be secured to a wall of an interior dwelling such that the plurality of corner cube reflectors face away from the wall, or it may be secured to a ceiling such that the plurality of corner cube reflectors face away from the ceiling.

An apparatus for retro-reflecting heat back to an individual includes a sheet having a first side and a second side, wherein an array of a plurality of corner cube reflectors is attached to the first side, wherein an edge of a face of each corner cube reflector abuts or is joined to an edge of a face of an adjacent corner cube reflector and the angle at which each of the edges abuts or is joined to respective edges is substantially 90°, wherein each of the corner cube reflectors includes at least a metallic surface. The sheet may be divided into at least two pivotally connected panels. The second side may include means (e.g., wire, hook, adhesive, pivoting connector, etc.) for securing the apparatus to a wall, ceiling, or floor.

An apparatus for retro-reflecting heat back to an individual includes a stand; a direction and height adjustable neck having a first end and a second end, wherein the first end is attached to the stand; and a head attached to the second end of the neck, wherein the head comprises a pivoting segmented array of a plurality of corner cube reflectors allowing the corner cube reflector array to be fully opened, partially closed, or fully closed to adjust the amount of heat returned therefrom, wherein within each segmented array, an edge of a face of each corner cube reflector abuts or is joined to an edge of a face of an adjacent corner cube reflector. Respective mirrors situated on an opposite side of the pivoting segmented corner cube reflector array for reflecting environmental heat toward the individual.

A wall hanging for retro-reflecting heat back to an individual includes a first side having an array of a plurality of corner cube reflectors, wherein an edge of a face of each corner cube reflector abuts or is joined to an edge of a face of an adjacent corner cube reflector, wherein each of the corner cube reflectors includes at least a metallic surface; a second side having depicted thereon at least one decorative element; and fastening means (e.g., wire, hook, temporary adhesive, pivoting connector, etc.) for securing the wall hanging to a wall and allowing the individual to flip the wall hanging to expose either the first or second side.

Retro-reflectors would decrease the net radiation heat loss from the clothing, thus heating up the outside of the clothing until convection losses increased enough to go back into energy balance. Meanwhile, the conduction loss through the clothing decreases so the inside of the clothing warms up too, and the individual becomes warmer. When net loss from all causes is about 120 watts, the person becomes comfortable.

Still other desirable features of the invention will become apparent to those of ordinary skill in the art upon reading and understanding the following detailed description, taken with the accompanying drawings, wherein like reference numerals represent like elements throughout.

DESCRIPTION OF THE PREFERRED EMBODIMENTS

The present invention will now be described with reference to the accompanying figures. It is to be understood that the specific system illustrated in the attached figures and described in the following specification is simply an exemplary embodiment of the present invention.

Figure 1:
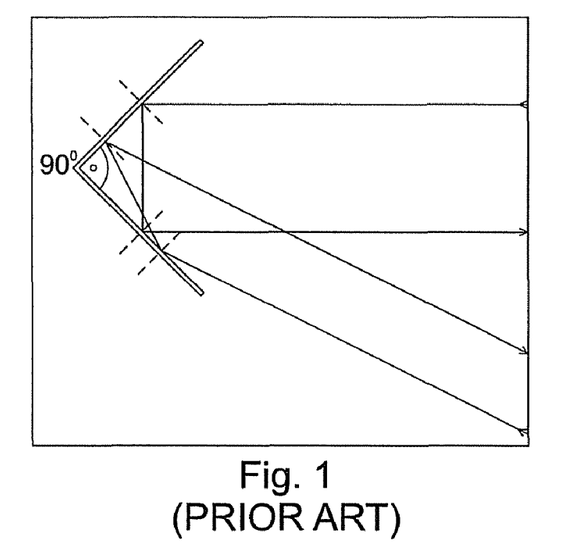
FIG. 1 is a diagram depicting the working principle of a corner reflector according to the prior art.

FIG. 1 depicts the working principles of a simple corner reflector. As is known in the art, a corner cube reflector includes three mutually perpendicular, intersecting flat surfaces, which reflect electromagnetic waves, including heat radiation, back to the source. In contrast, a flat reflector (e.g., mirror), causes heat reflected therefrom to bounce off at an angle of reflection equal to the angle of incidence, so heat will only return to the source from the portion of the flat reflector that is aligned perpendicularly to the source. One solution is to curve the reflective surface, which is adequate to the extent that the area to be kept warm is near the center of curvature of the curved reflective surface. However, if the reflective surface is an array of corner reflectors facing the person, it will bounce much of the heat right back to the person radiating it. Furthermore, distance from the person to the retro-reflector is much less important than it is for flat reflectors. In the direction of the retro-reflective array, if that array is somewhat near to being perpendicular to them, the person experiences an effective environment temperature much nearer to his or her own surface temperature than to the actual temperature of the infrared retro-reflective surface.

What one observes when looking at a shiny reflector plays a large part in determining the benefit to be obtained from heat reflected back. For example, if one's own reflection takes up 30% of the area of the mirror that is being looked at, then only 30% of the area of the mirror is reflecting one's heat back to the person. The closer one is to a flat mirror, the bigger solid angle one's image takes up and the more heat one receives if the mirror reflects heat. Corner reflector arrays do not suffer the same distance limitations as a single flat surface reflector does. In a corner reflector array, as one gets further away, as long as the dimension of the individual corner reflectors is small compared to the size of the reflection of short body dimensions, the angle subtended by one's image stays similar with distance if the array is sufficiently large enough. The heat per image area gets smaller with distance squared for corner reflector arrays, that is, the inverse square law still applies, but the area of reflection sending back heat does not get smaller at the same rate per distance as it does for flat reflectors.

Figure 2:
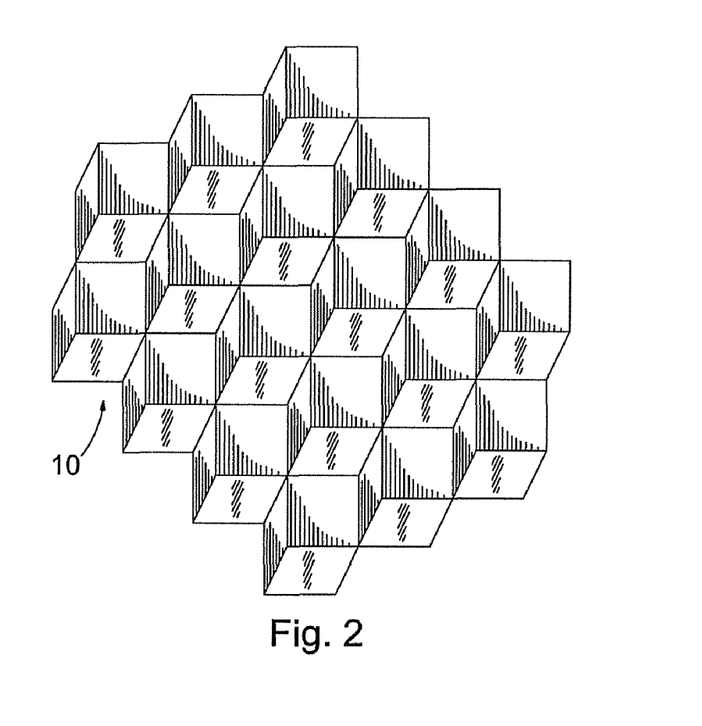
FIG. 2 is a front plan view of a corner cube reflector array in accordance with the present invention.

The present invention reflects heat using a corner reflector array, such as a corner cube reflector array 10 depicted in FIG.

2. Desirably, the corner cube reflector array 10 is constructed of a plurality of full cube corner reflectors arranged such that each edge of a face of each corner cube reflector abuts or is joined to an edge of a face of an adjacent corner cube reflector. The corner cube reflector may be defocused by changing the angles at which the faces meet, so that less heat is reflected directly back to the source. It is to be understood that the corner reflector array may be embodied as triangular corner reflectors depending upon the application of the corner reflector array (e.g., around corners). Thus, although various embodiments discussed herein are discussed in the context of a corner cube reflector array, it is to be understood that they may alternatively encompass the aforementioned triangular corner reflectors. The size (e.g., ¼" to 2" cubed) of each of the corner cube reflectors may differ based on application of use. The infrared radiation emitted by persons or their clothing are such that about 90% of the energy is in wavelengths shorter than 35 micrometers or 0.0014 inch, so that corner cube reflectors smaller than several times this size will have lowered efficiency. The modern sculpture-like appearance of an array of relatively large-sized individual cube corners array may be cosmetically valuable for some applications. Because the construction of the corner cube reflector array 10 may be fragile, it may be embodied as a vacuum-formed lightweight retro-reflective sheet that is sufficiently inexpensive to be considered disposable. Thus, in applications where the corner cube reflector array 10 would be in repeated contact with an individual or have stresses applied to it (e.g., cleaning of an object embodying the corner cube reflector array 10), the corner cube reflector array 10 may be designed to be replaceable.

The corner reflector array 10 may be constructed of any suitable material. For example, a visibly metallic surface may not be necessary for heat reflection. It is known in the art that coatings that include certain metal oxides can also reflect infrared energy. However, it is to be understood that the use of different materials, depending on application of use of the corner reflector array 10, may be more practical in those specific applications. For example, ornamental printed subject matter may be displayed on low emissivity surfaces of the array 10 such that the array 10 incorporates some form of aesthetic appeal. As another example, a soft reflective plastic corner reflector array may have the advantage of being less abrasive if bumped. Alternatively, abrasiveness may be reduced by modifying the structure of the corner reflector array 10. For example, a corner cube reflector array having square faces may have the corners thereof inverted such that a triangular-faced corner cube cavity replaces the point of each corner. Thus, a tradeoff may result between the percentage energy retro-reflected and the abrasiveness of the retro-reflector array by varying the size of the triangular-faced part of the array. It is to be understood that an array with all triangular-faced corner cubes would work, but that a smaller percentage of incoming heat would be retro-reflected in relation to an array having only square faces. Furthermore, any of such arrays may be variably defocused by stretching, bending or tilting thereof in order to control the amount of heat returned. Therefore, such arrays may include suitable mechanisms, such as a hanging pull-chain control, that allows the array to be fully or partially extended, retracted, or rotated.

Figure 3:
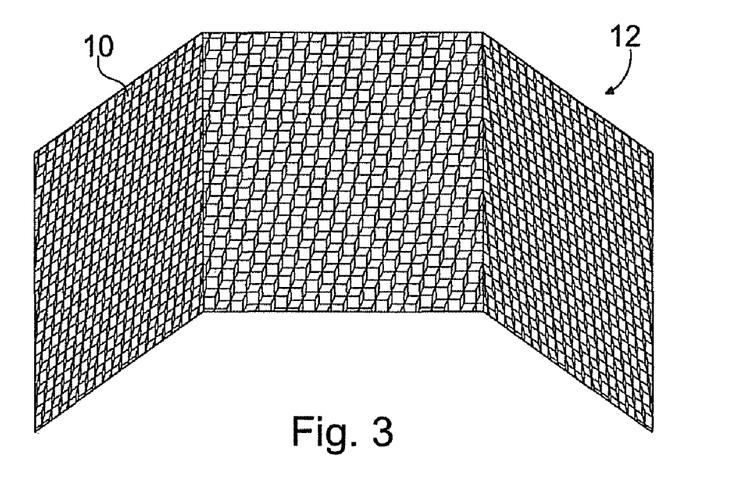
FIG. 3 depicts a standing corner cube reflector array panel arrangement in accordance with the present invention.

The corner cube reflector array 10 of FIG. 2 may be used in connection with interior surfaces (e.g., wall, ceiling, floor) of a living or work environment. For example, as shown in FIG. 3, the corner cube reflector array may be embodied as a standing fold-up retro-reflective panel arrangement 12 having two or more panels vertically hinged together, for example, wherein each panel contains the corner cube reflector array 10. Such an arrangement 12 may be placed near to and facing an individual's sitting or work area to continually warm that individual. It is to be understood that the arrangement 12 may be sized to be placed in different areas. For example, the arrangement 12 may be sized and adapted to fit under an individual's desk to reflect the individual's heat to their feet during cooler weather. The fold-up aspect and, hence, portability thereof, allows the arrangement 12 to be moved or stowed during warmer weather. In an alternative embodiment, it is also envisioned that the underside of a desk or table may be covered with retro-reflective sheeting to keep feet and legs warm.

Figure 4A:
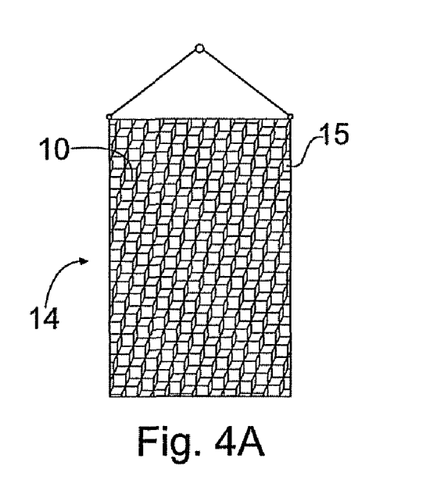
FIGS. 4a and 4b depict a wall hanging having a corner cube reflector array on one side and a decorative element on the other side in accordance with the present invention.
Figure 4B:
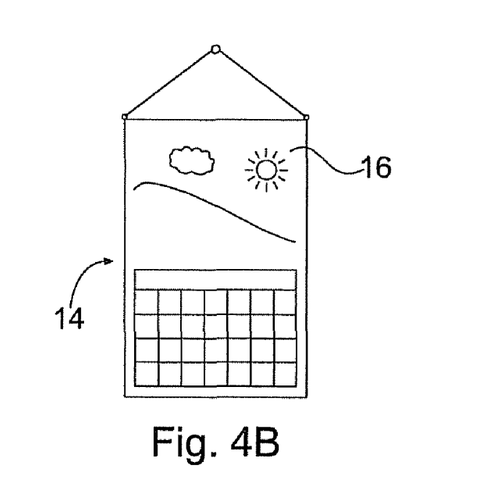

Another embodiment of the present invention, as shown in FIGS. 4a and 4b, includes a two-sided wall hanging 14 having the corner cube reflector array 10 on one side 15 and a decorative element on the other side 16. The wall hanging 14 may be hung on an office or cubicle wall. Thus, the retro-reflective side 15 may be exposed (i.e., facing an individual) when an individual feels cool, whereas the decorative element side 16 may be exposed by flipping the wall hanging when the ambient room temperature feels comfortable to the individual. With respect to coatings, a gold retro-reflective coating may give a rich and warm feel, as gold is highly reflective of heat. The arrangement of the corner cubes may also serve the function of decoration (e.g., mosaic patterns).

Figure 5:
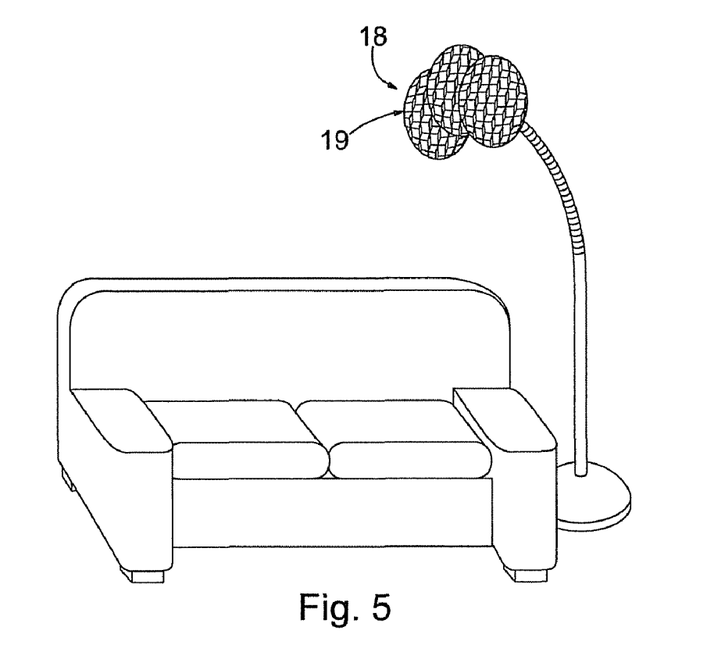
FIG. 5 depicts a posable floor apparatus having a corner cube reflector array integrated therein in accordance with the present invention.

In still another embodiment, a posable floor apparatus 18 may include a corner cube reflector array 10 integrated therein, as shown in FIG. 5. For example, the posable floor apparatus 18 may be fan-shaped and may be constructed of pivoting, pie-shaped retro-reflector array segments, which may be fully opened, partially closed, or fully closed to adjust the amount of returned heat needed to make the person feel sufficiently warm. The pie-shaped retro-reflector array segments may be positioned on adjustable necks or supports in order to adjust the position, height and angle to provide a desired amount of warmth. The back side of the posable floor apparatus 18 may incorporate a heat-reflective flat mirror 19 which may be aimed to reflect heat to the individual from an even hotter part of the environment, such as a fireplace or wood stove, for example. Alternatively, when the individual feels too hot, this heat mirror may be used to direct part of the individual's heat radiation to the coolest direction in the environment which returns the least heat back, such as towards the cooler floor, an air conditioner vent, or a window to the outside, for example. Thus the flat mirror may help the individual feel cooler in a mostly hot environment.

Figure 6:
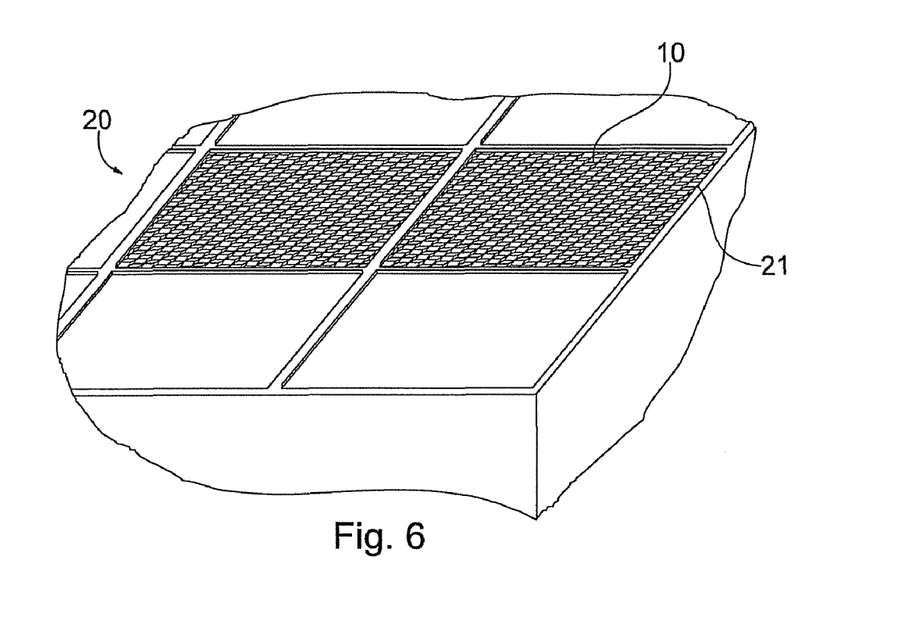
FIG. 6 depicts a corner cube reflector array associated with a ceiling in accordance with the present invention.

FIG. 6 depicts the corner cube reflector array 10 associated with a ceiling such that heat of an individual may be reflected from overhead. For example, ceiling tiles 21 may be manufactured that incorporate the corner cube reflector array 10, which allows the replacement of either some or all of the existing ceiling tiles 21 in an office. A few ceiling tiles 21 incorporating the corner cube reflector array 10 may be placed directly over the spot a person normally sits or stands, thereby causing the person to feel substantially warmer in that specific location, as opposed to areas that do not utilize the corner cube reflector array 10.

Figure 7:
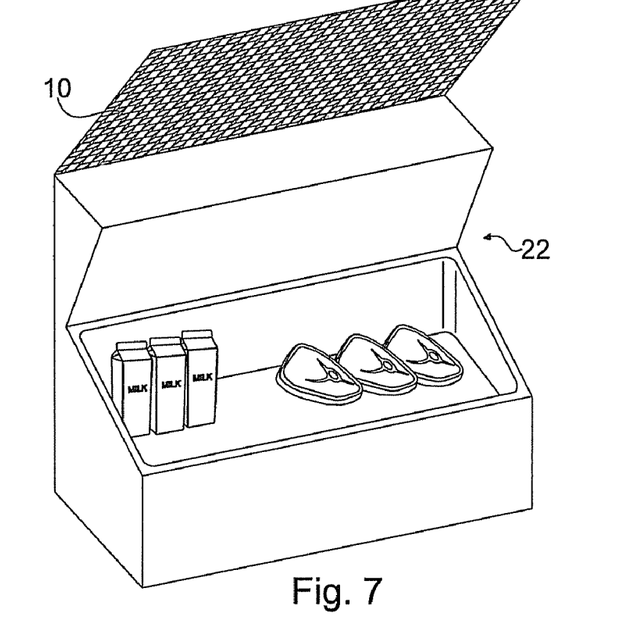
FIG. 7 depicts a corner cube reflector array associated with an overhang or aisle ceiling along a supermarket cooler or freezer in accordance with the present invention.

Similarly, a heat retro-reflective ceiling in a walk-in cooler or freezer would provide the people working in the cooler with a somewhat warmer feeling ambient temperature. The aforementioned corner cube reflector array 10 ceiling arrangement may also be utilized to keep cold items cold using less energy. For example, as shown in FIG. 7, the overhang or aisle ceiling near a supermarket cooler or dairy case 22 may be covered with heat retro-reflective array tiles 21, which would keep the cold items in the cooler 22 even colder, since the reflection realized by the cold items are the items' own cold reflection, rather than the ceiling's warmer temperature radiation. Thus, the items receive less radiative heat energy and stay cooler with less cooler energy expenditure. In contrast, the workers or customers stay warmer since they are getting a portion of their own energy back. Therefore, just by adding a retro-reflective array inside the top of open supermarket coolers 22, it is possible to keep contents therein even cooler. Of note, linear simple corner reflectors would work to keep long coolers 22 colder if aligned parallel to the long direction of the cooler.

Figure 8:
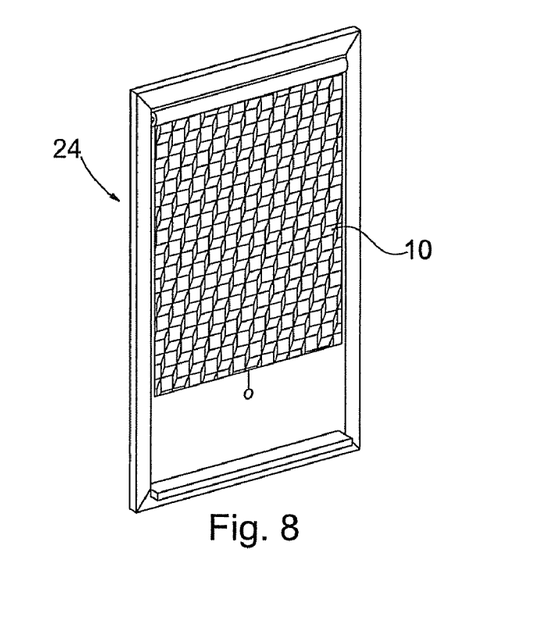
FIG. 8 depicts a window shade having a corner cube reflector array on an interior facing side thereof in accordance with the present invention.

In a further embodiment, as shown in FIG. 8, a window shade, a Venetian blind, or other covering or window treatment 24 may include a two-sided retro-reflective flexible sheeting that inhibits solar heat from entering a dwelling in hot weather, but reflecting back heat energy (i.e., minimizing heat energy loss) in cool weather. Alternatively, one side of the window treatment 24 may include the corner cube reflector array 10. Control of the amount of heat returned may be accomplished by changing the amount of window treatment exposed by the raising or lowering thereof, or by changing the tilt angle of the window treatment 24. The adjustability principles (e.g., up/down positioning) of the window treatment 24 may also be embodied by a wall covering that includes the corner cube reflector array 10. The control of the amount of heat returned may be accomplished by changing the amount of retro-reflective wall covering exposed by the raising or lowering, or retraction or extraction thereof.

Figure 9:
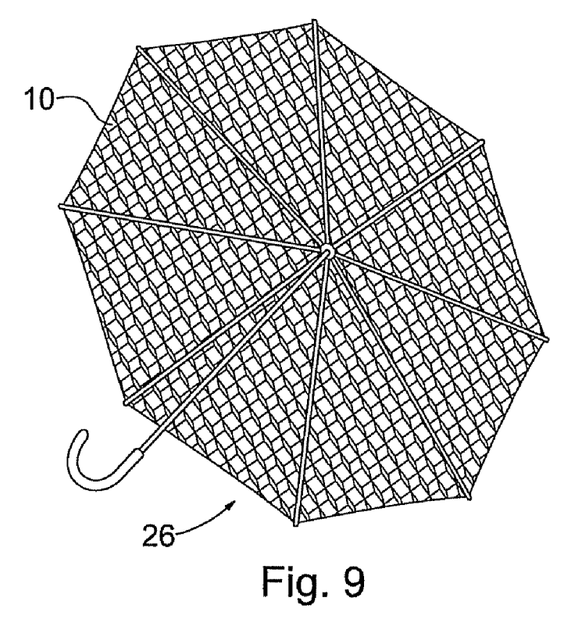
FIG. 9 depicts an umbrella having a corner cube reflector array on an underside portion thereof in accordance with the present invention.

As shown in FIG. 9, an umbrella 26 or other outdoor covering, may include the corner cube reflector array 10 on an underside portion, which would then return a substantial portion of the body heat to a person holding or underneath the umbrella 26. Such an umbrella 26 would keep a person warmer as well as drier outside in the rain. Inside homes, a decorative parasol having a retro-reflective underside may be supported over or near a chair to increase personal comfort to the person sitting there. The parasol may be removed or folded up if the person feels too warm.

Figure 10:
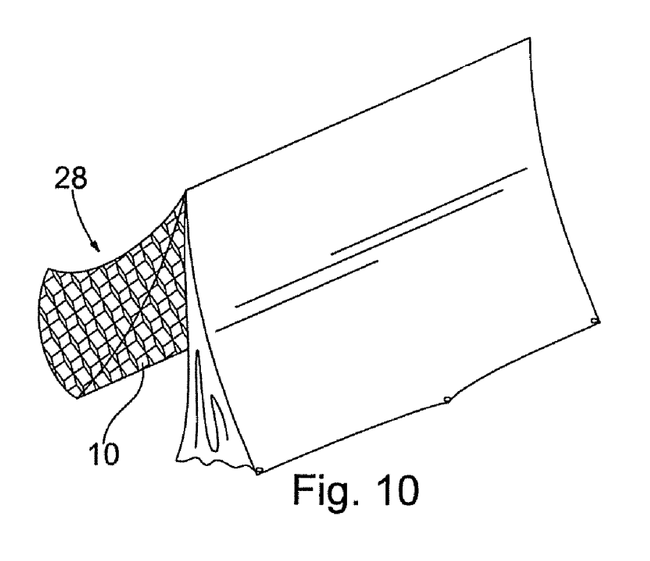
FIG. 10 depicts a tent having a corner cube reflector array on an inside top portion of the tent in accordance with the present invention.

FIG. 10 depicts a tent 28 having the corner cube reflector array 10 on an inside top portion thereof. Thus, this arrangement would be conducive to when the tent 28 is used in colder weather, as heat would be reflected to the individual situated within the tent 28.

Figure 11:
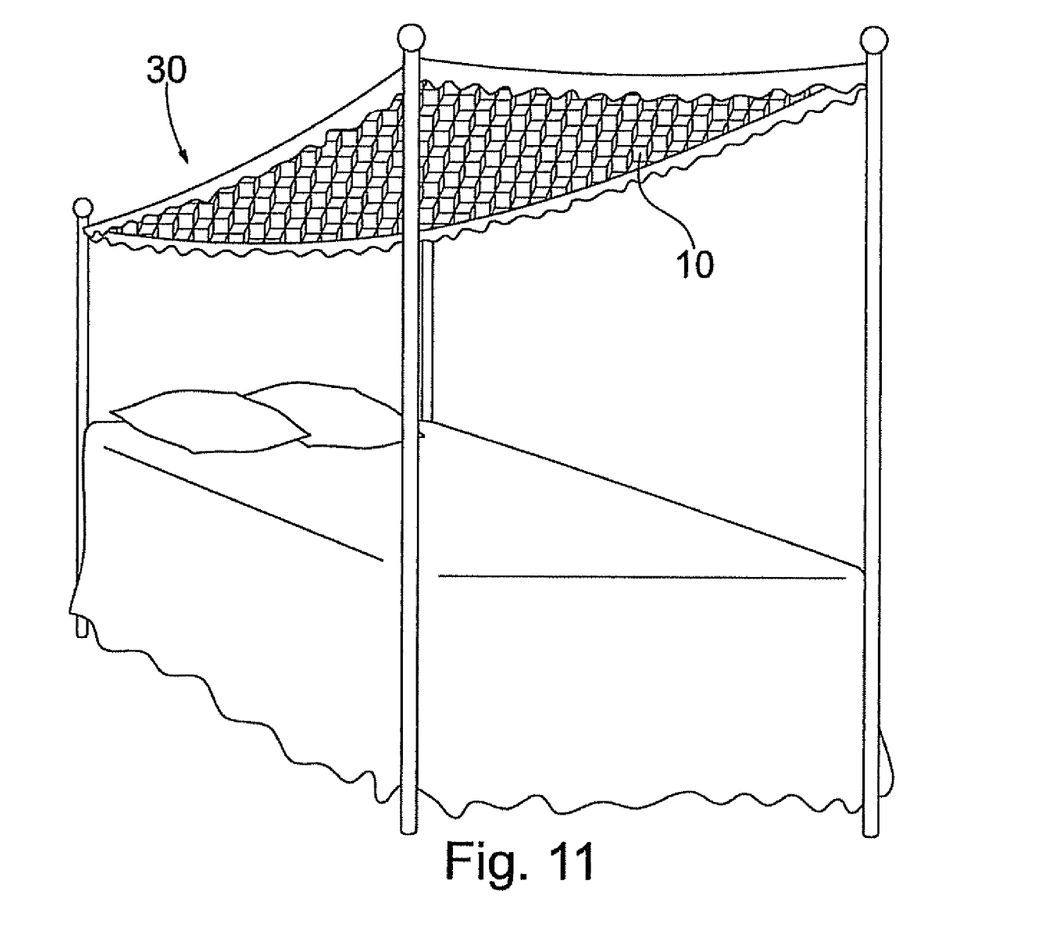
FIG. 11 depicts a bed having a canopy with a corner cube reflector array on an underside of the canopy in accordance with the present invention.

FIG. 11 depicts a bed 30 having a canopy with the corner cube reflector array 10 on an underside of the canopy. Thus, this arrangement may be useful if an individual desires additional warmth when sleeping.

The corner cube reflector array 10 may be embodied on a sheet for application to various surfaces. Thus, the sheet may include a first side having the corner cube reflector array 10 and a second side having an adhesive backing. Alternatively, the second side may include one or more fasteners (e.g., wire, hook) for attaching the sheet to the various surfaces. Many of the applications need not have an array of cube corners embodied in a relatively flat arrangement, as gently curved shapes may improve the efficiency in some applications. For example, a canopy for a baby crib may be slightly dome-shaped so that more of the individual cube corners in the array have their axis pointed at where the baby sleeps, since an individual cube corner reflects less heat back for objects some angle away from the perpendicular axis.

It is to be understood that any of the applications or embodiments discussed herein may include mechanisms for reducing the amount of the corner cube reflector array 10 exposed, to thereby control the amount of heat reflected.

The invention has been described with reference to the desirable embodiments. Modifications and alterations will occur to others upon reading and understanding the preceding detailed description. It is intended that the invention be construed as including all such modifications and alterations insofar as they come within the scope of the appended claim or the equivalents thereof.

The invention claimed is:

1. An apparatus for retro-reflecting heat back to an individual, the apparatus comprising:
   a stand;
   a direction and height adjustable neck having a first end and a second end, wherein the first end is attached to the stand; and
   a head attached to the second end of the neck, wherein the head comprises a pivoting segmented array of a plurality of corner cube reflectors allowing the corner cube reflector array to be fully opened, partially closed, or fully closed to adjust the amount of heat returned therefrom, wherein within each segmented array, an edge of a face of each corner cube reflector abuts or is joined to an edge of a face of an adjacent corner cube reflector, and wherein the corner cube reflectors are at least ¼" cubed.

2. The apparatus of claim 1, further comprising respective mirrors situated on an opposite side of the pivoting segmented corner cube reflector array for reflecting environmental heat toward the individual.

* * * * *